United States Patent
Wang et al.

(10) Patent No.: US 10,829,624 B2
(45) Date of Patent: Nov. 10, 2020

(54) POLYPROPYLENE COMPOSITION WITH IMPROVED HEAT RESISTANCE

(71) Applicant: BOREALIS AG, Vienna (AT)

(72) Inventors: Jingbo Wang, Engerwitzdorf (AT); Markus Gahleitner, Neuhofen/Krems (AT); Petar Doshev, Linz (AT); Georg Grestenberger, St. Peter in der Au (AT)

(73) Assignee: BOREALIS AG, Vienna (AT)

( * ) Notice: Subject to any disclaimer, the term of this patent is extended or adjusted under 35 U.S.C. 154(b) by 41 days.

(21) Appl. No.: 16/303,341

(22) PCT Filed: Jun. 2, 2017

(86) PCT No.: PCT/EP2017/063488
§ 371 (c)(1),
(2) Date: Nov. 20, 2018

(87) PCT Pub. No.: WO2017/211723
PCT Pub. Date: Dec. 14, 2017

(65) Prior Publication Data
US 2019/0169409 A1 Jun. 6, 2019

(30) Foreign Application Priority Data
Jun. 6, 2016 (EP) .................................. 16173183

(51) Int. Cl.
*C08L 23/12* (2006.01)
*C08F 110/06* (2006.01)
(Continued)

(52) U.S. Cl.
CPC ............. *C08L 23/12* (2013.01); *C08F 110/06* (2013.01); *C08F 4/6492* (2013.01); *C08F 4/651* (2013.01);
(Continued)

(58) Field of Classification Search
CPC .......................... C08L 23/12; C08L 2205/025
See application file for complete search history.

(56) References Cited

U.S. PATENT DOCUMENTS 6,455,643 B1 *  9/2002  Harlin ..................... C08F 10/06
                                                      526/65
8,541,507 B2 *  9/2013  Doshev .................. C08L 23/12
                                                      525/191
(Continued)

FOREIGN PATENT DOCUMENTS

CN  102124151 A   7/2011
CN  102869718 A   1/2013
(Continued)

OTHER PUBLICATIONS

Chatterjee et al. Journal of Applied Polymer Science, vol. 96, 1021-1028 (2005). DOI 10.1002/app.21313. (Year: 2005).*
(Continued)

*Primary Examiner* — Michael M Dollinger
(74) *Attorney, Agent, or Firm* — Lowenstein Sandler LLP (57) ABSTRACT

The present invention is directed to a polypropylene composition, said polypropylene composition comprising two different polypropylene fractions (PP1) and (PP2), wherein the first polypropylene (PP1) has a weight molecular weight Mw in the range of above 45 kg/mol to below 65 kg/mol and a melting temperature of at least 140° C.

16 Claims, 2 Drawing Sheets

Influence of the wax on the MFR of the blends (51) Int. Cl.
*C08F 4/649* (2006.01)
*C08F 4/651* (2006.01)
(52) U.S. Cl.
CPC ....... *C08L 2203/12* (2013.01); *C08L 2203/16* (2013.01); *C08L 2205/025* (2013.01); *C08L 2207/02* (2013.01)

(56) References Cited

U.S. PATENT DOCUMENTS

| | | | | |
|---|---|---|---|---|
| 9,096,751 | B2 * | 8/2015 | Bergstra | C08L 23/12 |
| 9,550,844 | B2 * | 1/2017 | Gahleitner | C08F 110/06 |
| 2007/0203299 | A1 * | 8/2007 | Mavridis | C08F 10/06 525/240 |
| 2011/0118370 | A1 * | 5/2011 | Jiang | C08F 255/02 521/95 |
| 2011/0160373 | A1 * | 6/2011 | Bernreitner | C08F 2/38 524/451 |
| 2012/0270039 | A1 * | 10/2012 | Tynys | C08L 23/10 428/338 |
| 2015/0045479 | A1 * | 2/2015 | Yang | C08L 23/14 524/35 |
| 2016/0023147 | A1 * | 1/2016 | Takebe | B01D 39/16 128/863 |

FOREIGN PATENT DOCUMENTS

| | | | | |
|---|---|---|---|---|
| CN | 103052741 | A | 4/2013 | |
| CN | 105143286 | A | 12/2015 | |
| DE | 102006029920 | A1 * | 1/2008 | C08L 2666/06 |
| EP | 0887379 | | 6/1998 | |
| EP | 2325248 | | 5/2011 | |
| EP | 2348058 | | 7/2011 | |
| EP | 2610272 | | 12/2011 | |
| EP | 2610271 | | 7/2013 | |
| EP | 2610273 | | 7/2013 | |
| JP | 2007321118 | A | 12/2007 | |
| WO | WO199212182 | | 7/1992 | |
| WO | WO199924478 | | 5/1999 | |
| WO | WO199924479 | | 5/1999 | |
| WO | WO200068315 | | 11/2000 | |
| WO | WO2004000899 | | 12/2003 | |
| WO | WO2004111095 | | 12/2004 | |
| WO | WO2012007430 | | 1/2012 | |
| WO | WO2015082379 | | 6/2015 | |
| WO | 2016005301 | A1 | 1/2016 | |
| WO | 2016053467 | A1 | 4/2016 | |

OTHER PUBLICATIONS

Cerrada et al. Macromol. Symp. 2003, 198, 91-101. DOI: 10.1002/masy.200350809. (Year: 2003).*
Singh, et al., Triad Sequence Determination of Ethylene-Propylene Copolymers—Application of Quantitative 13C NMR, Polymer Testing, 29, 2009, pp. 475-479, Elsevier, Ltd.
Zhou, et al., "A new decoupling method for accurate quantific ation of polyethylene copolymer composition and triad sequence distribution with 13C NMR," Journal of Magnetic Resonance, vol. 187, 2007, pp. 225-233, Elsevier, Ltd.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134, Wiley InterScience.
Resconi, et al., "Selectivity in Propene Polymerization with Metallocene Catalysts," Chem. Rev., vol. 100, 2000, pp. 1253-1345, American Chemical Society.
Cheng, H.N., "C NMR Analysis of Ethylene-Propylene Rubbers," Macromolecules, vol. 17, 1984, pp. 1950-1955, American Chemical Society.
Wang, et al., "Structural Analysis of Ethylene/Propylene Copolymers Synthesized with a Constrained Geometry Catalyst," Macromolecules, vol. 33, 2000, pp. 1157-1162, American Chemical Society.
International Search Report and Written Opinion for PCT/EP2017/063488 dated Aug. 1, 2017, 10 pgs.
Kakugo, et al., "13C NMR Determination of Monomer Sequence Distribution in Ethylene-Propylene Copolymers Prepared with s-TiCL13-AL (C2H5)2C1," Macromolecules, vol. 15, 1982, pp. 1150-1152, American Chemical Society.
Zweifel, H., et al., "Solubility of Additives in Polymers," Plastics Additives Handbook, 6th Edition, 2009, pp. 1141-1190, Hanser Publishers, Munich.
European Search Report for Application No. 16173183.1 dated Jul. 27, 2020, 4 pages.
Office Action and English Translation Thereof for Chinese patent application No. 201780031464, dated Jul. 3, 2020, 13 pages.
Lu Changchun, "Development and Current Situation of Polypropylene Fiber Technology", China Chemical Fiber New Tech, Development Center 100020, Aug. 31, 2000, 6 pages.
Watanabe, et al, "Development of Polypropylene Nanofiber Production System", Polymer Reviews, 51:288-308, Dec. 31, 2011, 21 pages.

* cited by examiner

Fig. 1: Influence of the wax on the MFR of the blends

Fig. 2: Heat resistance performance (HDT ISO75B) of the PP / wax mixtures based on PP2

Fig. 3: Stiffness performance (tensile modulus) of the PP / wax mixtures based on PP2

Fig. 4: Effect of melt temperature on hydrohead for inventive and comparative example

POLYPROPYLENE COMPOSITION WITH IMPROVED HEAT RESISTANCE

CROSS-REFERENCE TO RELATED APPLICATIONS

This application is a national phase entry under 35 U.S.C. § 371 of International Application No. PCT/EP2017/063488, filed on Jun. 2, 2017, which claims the benefit of priority of European Patent Application No. 16173183.1, filed on Jun. 6, 2016. The contents of these applications are hereby incorporated by reference herein their entirety.

SUMMARY

The present invention is directed to a polypropylene composition, said polypropylene composition comprising two different polypropylene fractions (PP1) and (PP2) and to films, molded articles or melt blown fibers made from this composition.

The application of waxes or polymeric fractions of very low molecular weight for the modification of polyolefins is a widely used technique. In particular, the main purpose of such waxes is to increase the melt flow rate as a flow enhancer, to serve as a carrier for a masterbatch or to generate hot melt adhesives. Due to the limitation of the current technology, mostly single site catalysts having a high $H_2$ response are applied for the preparation of polyolefin waxes which allows the direct preparation of oligomers in reactor. For example, the commercial products Licocene by Clariant are prepared accordingly.

However, due to the stereo- and regiospecific limitations of single site catalysts, the resulting waxes contain high amounts of stereo- and regioerrors whereupon the melting temperatures of such materials are very low. Therefore, the applicability of waxes obtained in the presence of single site catalysts is limited in case a high heat resistance of the final product is required.

Thus, there is a need in the art to provide a modified polypropylene material having a high melt flow rate which is stable at high temperatures.

Accordingly, it is an object of the present invention to provide a polypropylene composition showing good flowablilty while the heat resistance is kept on a high level.

The finding of the present invention is to provide a polypropylene composition which comprises two polypropylenes wherein one of said polypropylenes has a low molecular weight and a high melting temperature.

It was found that molded articles and films comprising the inventive polypropylene composition have an increased melt flow rate while the modulus and heat resistance is improved.

On the other hand, it was found that the inventive polypropylene is also applicable for the preparation of melt blown fibers and melt blown webs of reduced water and air permeability.

Accordingly, the present invention is directed to a polypropylene composition (PC) comprising
a) a first polypropylene (PP1) having a weight molecular weight Mw in the range of above 45 kg/mol to below 65 kg/mol and a melting temperature of at least 140° C., and
b) a second polypropylene (PP2) having a higher weight molecular weight Mw than the first polypropylene (PP1).

In one embodiment of the present invention, the first polypropylene (PP1) has a molecular weight distribution (Mw/Mn) in the range of 4.0 to 10.0.

In another embodiment of the present invention, the first polypropylene (PP1) has a xylene cold soluble (XCS) fraction in the range of 1.0 to 20.0 wt.-%.

In still another embodiment of the present invention, the mixture (M) consisting of the first polypropylene (PP1) and the second polypropylene (PP2) has a melting temperature of at least 150° C.

In a further embodiment of the present invention, the second polypropylene (PP2) is a propylene homopolymer.

In one embodiment of the present invention, the amount of the first polypropylene (PP1) and the second polypropylene (PP2) together makes up at least 80 wt.-% of the polypropylene composition (PC).

In another embodiment of the present invention, the polypropylene composition (PC) comprises at least 66 wt.-% of the second polypropylene (PP2) and/or at least 5 wt.-% of the first polypropylene (PP1).

It is especially preferred that the weight ratio between the first polypropylene (PP1) and the second polypropylene (PP2)[wt.-% (PP1)/wt.-% (PP2)] is in the range of 0.02 to 0.60.

In one embodiment of the present invention, the first polypropylene (PP1) has been polymerized in the presence of
a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester;
b) optionally a co-catalyst (Co), and
c) optionally an external donor (ED).

In one embodiment of the present invention, the mixture (M) consisting of the first polypropylene (PP1) and the second polypropylene (PP2) has a melt flow rate $MFR_2$ (230° C.) measured according to ISO 1133 in the range of 2.0 to 50 g/10 min and/or a weight molecular weight Mw in the range of 200 to 560 kg/mol and the weight molecular weight Mw of the second polypropylene (PP2) is in the range of 210 to 950 kg/mol.

Alternatively to the previous paragraph, the mixture (M) consisting of the first polypropylene (PP1) and the second polypropylene (PP2) has a melt flow rate $MFR_2$ (230° C.) measured according to ISO 1133 in the range of 500 to 5000 g/10 min and/or a weight molecular weight Mw in the range of 65 to 100 kg/mol and the weight molecular weight Mw of the second polypropylene (PP2) is in the range of 70 to 125 kg/mol.

The present invention is further directed to a film and a molded article comprising the polypropylene composition (PC).

For a film and a molded article comprising the polypropylene composition (PC), it is especially preferred that the mixture (M) consisting of the first polypropylene (PP1) and the second polypropylene (PP2) has a melt flow rate $MFR_2$ (230° C./2.16 kg) measured according to ISO 1133 in the range of 2.0 to 50 g/10 min and/or a weight molecular weight Mw in the range of 200 to 560 kg/mol.

The present invention is also directed to a melt blown fiber, comprising the polypropylene composition (PC).

For a melt blown fiber comprising the polypropylene composition (PC), it is especially preferred that the mixture (M) consisting of the first polypropylene (PP1) and the second polypropylene (PP2) has a melt flow rate $MFR_2$ (230° C./2.16 kg) measured according to ISO 1133 in the range of 500 to 5000 g/10 min and/or a weight molecular weight Mw in the range of 65 to 100 kg/mol.

Preferably, the amount of the polypropylene composition (PC) makes up at least 80 wt.-% of the melt blow fiber (MBF).

In addition, the present invention is directed to a melt-blown web (MBW) comprising melt blow fibers (MBF) as defined above and in more detail below.

It is especially preferred that the melt-blown web (MBW) has a weight per unit area of at most 120 g/m².

Additionally, the invention is directed to an article comprising a melt-blown web (MBW) as defined above and in more detail below wherein article is selected from the group consisting of filtration medium, diaper, sanitary napkin, panty liner, incontinence product for adults, protective clothing, surgical drape, surgical gown, and surgical wear.

DETAILED DESCRITPION

Figure 1:
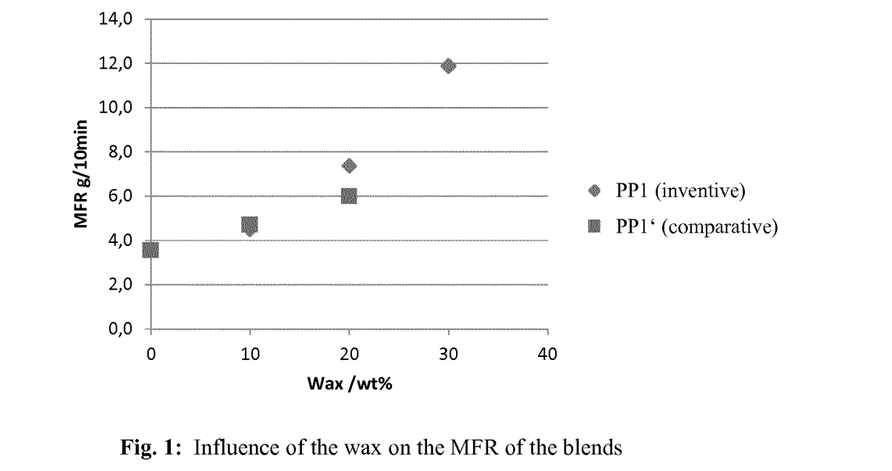
FIG. 1 compares the influence of amount of wax on melt flow rate between inventive and comparative examples.
Figure 2:
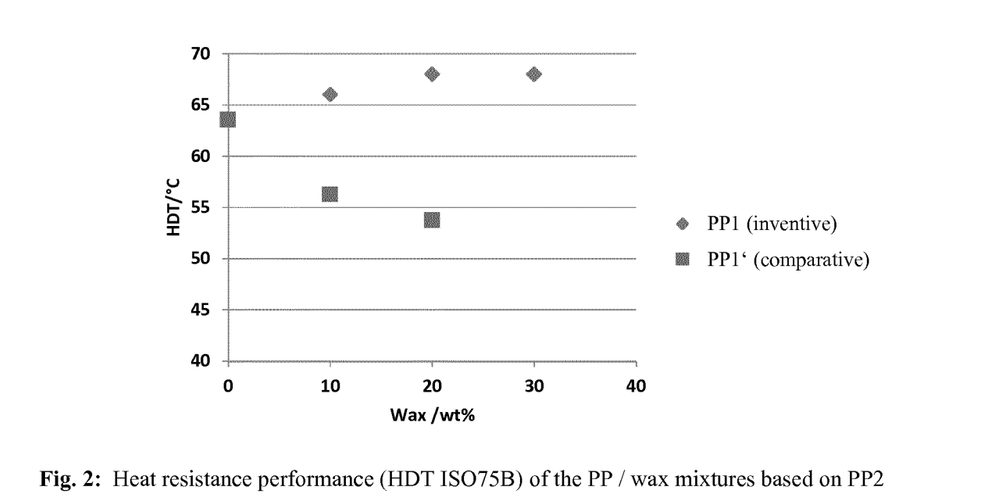
FIG. 2 compares the influence of amount of wax on heat resistance performance between inventive and comparative examples.
Figure 3:
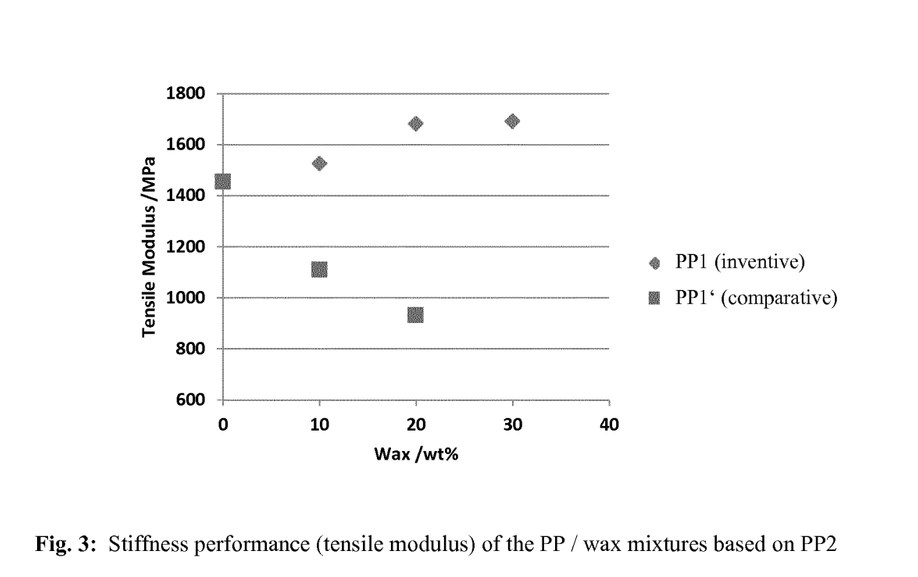
FIG. 3 compares the influence of amount of wax on stiffness performance between inventive and comparative examples.
Figure 4:
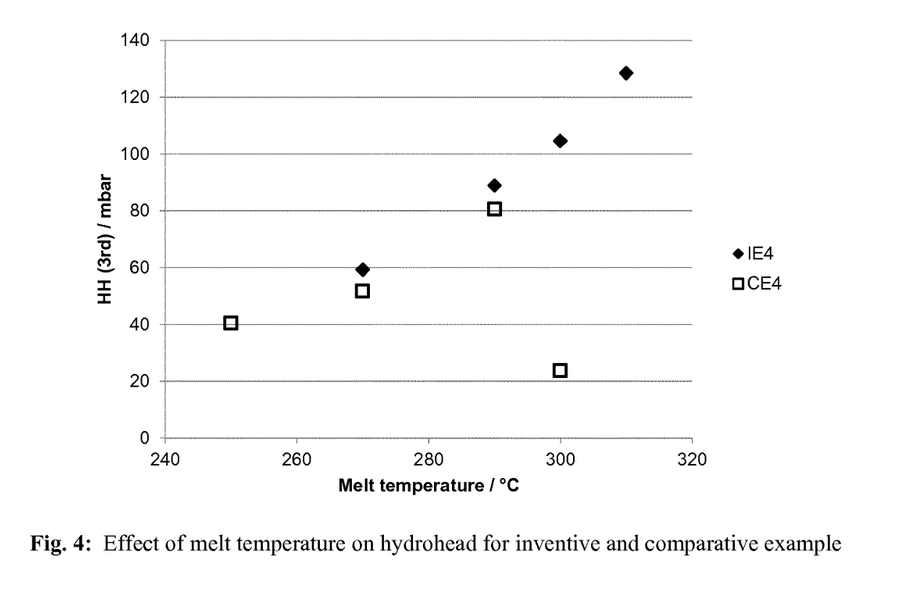
FIG. 4 compares the influence of melt temperature on water resistance between inventive and comparative examples.

In the following, the present invention is described in more detail.

The Polypropylene Composition (PC) and the Mixture (M)

The polypropylene composition (PC) according to this invention comprises a first polypropylene (PP1) and a second polypropylene (PP2).

In one specific embodiment the polypropylene composition (PC) consists of the mixture (M), i.e. the mixture of the first polypropylene (PP1) and the second polypropylene (PP2), and additives (AD), wherein more preferably the amount of the mixture (M), i.e. of the mixture of the first polypropylene (PP1) and the second polypropylene (PP2), is at least 85 wt.-%, yet more preferably at least 90 wt.-%, like at least 95 wt.-%, based on the total weight of the polypropylene composition (PC).

As mentioned above the polypropylene composition (PC) comprises a first polypropylene (PP1) and a second polypropylene (PP2). It is preferred that the first polypropylene (PP1) and the second polypropylene (PP2) together make up the main part of the polypropylene composition (PC). According to this invention the mixture (M) is regarded as a mixture consisting of the first polypropylene (PP1) and the second polypropylene (PP2). Accordingly, in one preferred embodiment the first polypropylene (PP1) and the second polypropylene (PP2) are the only polypropylenes, more preferably the only polymers in the polypropylene composition (PC). Therefore, it is preferred that the polypropylene composition (PC) comprises at least 80 wt.-%, more preferably at least 85 wt.-%, yet more preferably at least 90 wt.-%, like at least 95 wt.-%, of the mixture (M), i.e. of the first polypropylene (PP1) and the second polypropylene (PP2) together, based on the total weight of the polypropylene composition (PC). The remaining part of the polypropylene composition (PC) is typical additives (AD). Thus in a preferred embodiment the polypropylene composition (PC) consists of the mixture (M), i.e. the mixture of the first polypropylene (PP1) and the second polypropylene (PP2), and the additives (AD), wherein more preferably the amount of the mixture (M), i.e. of the mixture of the first polypropylene (PP1) and the second polypropylene (PP2), is at least 85 wt.-%, yet more preferably at least 90 wt.-%, like at least 95 wt.-%, based on the total weight of the polypropylene composition (PC).

As mentioned above the polypropylene composition (PC) comprises the first polypropylene (PP1) and the second polypropylene (PP2). It is preferred that the weight ratio between the first polypropylene (PP1) and the second polypropylene (PP2) [wt.-% (PP1)/wt.-% (PP2)] is in the range of 0.02 to 0.60, more preferably in the range of 0.05 to 0.52, yet more preferably in the range of 0.08 to 0.48, like in the range of 0.09 to 0.43.

As explained in detail below the first polypropylene (PP1) and/or the second polypropylene (PP2) optionally comprise apart from propylene also comonomers. Accordingly, the mixture (M) and/or the polypropylene composition (PC) comprise(s) apart from propylene ethylene and/or $C_4$ to $C_{12}$ α-olefins.

Thus the mixture (M) and/or the polypropylene composition (PC) may comprise in addition to propylene monomers such as ethylene and/or $C_4$ to $C_{12}$ α-olefins, in particular ethylene and/or $C_4$ to $C_8$ α-olefins, e.g. ethylene, 1-butene and/or 1-hexene.

In case first polypropylene (PP1) and/or the second polypropylene (PP2) contain comonomers such as ethylene and/or $C_4$ to $C_{12}$ α-olefins, the mixture (M) and/or the polypropylene composition (PC) preferably has/have a comonomer content, like an ethylene content, of at most 2.0 wt.-%, more preferably in the range of 0.2 to 1.5 wt.-%, yet more preferably in the range of 0.4 to 1.0 wt.-%.

However, it is preferred that the first polypropylene as well as the second polypropylene are propylene homopolymers.

The mixture (M) and/or the polypropylene composition (PC) has/have preferably a rather high melting temperature Tm. Accordingly, it is preferred that the mixture (M) and/or the polypropylene composition (PC) has/have a melting temperature Tm of at least 150° C., more preferably in the range of 152 to 170° C., yet more in the range of 155 to 167° C., still yet more preferably in the range of 157 to 165° C.

Further, it is preferred that the melt enthalpy (Hm) determined according to ISO 11357-3 of the mixture (M) is above 100 J/g, more preferably in the range of above 104 to 120 J/g, still more preferably in the range of 105 to 115 J/g.

Additionally, it is preferred that the mixture (M) and/or the polypropylene composition (PC) has/have a xylene cold soluble (XCS) content in the range of 1.0 to 10.0 wt.-%, more preferably in the range 1.3 to 8.0 wt.-%, yet more preferably in the range of 1.5 to 7.5 wt.-%, like in the range of 1.8 to 7.0 wt.-%.

According to a first embodiment of the present invention, it is especially preferred that the mixture (M), i.e. the mixture of the first polypropylene (PP1) and the second polypropylene (PP2), has a melt flow rate $MFR_2$ (230° C.) measured according to ISO 1133 in the range of 2.0 to 50.0 g/10 min, more preferably in the range of 2.5 to 30.0 g/10 min, more preferably in the range of 3.0 to 25.0 g/10min.

Additionally or alternatively to the previous paragraph it is preferred that the mixture (M), i.e. the mixture of the first polypropylene (PP1) and the second polypropylene (PP2), has a weight molecular weight Mw in the range of 200 to 560 kg/mol, more preferably in the range of 220 to 540 kg/mol, like in the range of 240 to 520 kg/mol.

Further it is preferred that the mixture (M), i.e. the mixture of the first polypropylene (PP1) and the second polypropylene (PP2), has a molecular weight distribution (Mw/Mn) in the range of 4.0 to 10.0, more preferably in the range of 4.5 to 9.0, like in the range of 5.0 to 8.0.

In a preferred embodiment the information provided for the mixture (M) with regard to the melt flow rate $MFR_2$, the weight molecular weight Mw as well as to the molecular weight distribution (Mw/Mn) is also applicable for the polypropylene composition (PC). This holds in particular true in case the polypropylene composition (PC) consists of the mixture (M) and optional additives (AD). Accordingly it is preferred that the polypropylene composition (PC) has a melt flow rate $MFR_2$ (230° C.) measured according to ISO 1133 in the range of 2.0 to 50.0 g/10 min, more preferably in the range of 2.5 to 30.0 g/10 min, more preferably in the range of 3.0 to 25.0 g/10min and/or a weight molecular weight in the range of 200 to 560 kg/mol, more preferably in the range of 220 to 560 kg/mol, like in the range of 240 to 520 kg/mol, and/or a molecular weight distribution (Mw/Mn) in the range of 4.0 to 10.0, more preferably in the range of 4.5 to 9.0, like in the range of 5.0 to 8.0.

It is especially preferred that the ratio of the weight molecular weight Mw of the mixture (M) to the weight molecular weight Mw of the first polypropylene (PP1) [Mw(M)/Mw(PP1)] is in the range of 1.4 to 20.0, more preferably in the range 1.5 to 17.0, yet more preferably in the range of 1.6 to 15.0.

Additionally or alternatively to the previous paragraph it is preferred that the weight molecular weight Mw of the polypropylene composition (PC) to the weight molecular weight Mw of the first polypropylene (PP1) [Mw(PC)/Mw(PP1)] is in the range of 1.4 to 20.0, more preferably in the range 1.5 to 17.0, yet more preferably in the range of 1.6 to 15.0.

Additionally, it is preferred that the ratio of the weight molecular weight Mw of the second polypropylene (PP2) to the weight molecular weight Mw of the mixture (M) [Mw(PP2)/Mw(M)] is in the range of more than 1.0 to 2.5, more preferably in the range of more than 1.0 to 2.0, yet more preferably in the range of 1.1 to 1.8.

Additionally or alternatively to the previous paragraph it is preferred that the ratio of the weight molecular weight Mw of the second polypropylene (PP2) to the weight molecular weight Mw of the polypropylene composition (PC) [Mw(PP2)/Mw(PC)] is in the range of more than 1.0 to 2.5, more preferably in the range of more than 1.0 to 2.0, yet more preferably in the range of 1.1 to 1.8.

The polypropylene composition (PC) (and thus also the mixture (M)) can be produced in a sequential polymerization process wherein in a first step the first polypropylene (PP1) and in a second step the second polypropylene (PP2) is produced. Alternatively, in the first step the second polypropylene (PP2) may be produced and subsequently in a second step the first polypropylene (PP1). However, it is especially preferred that the polypropylene composition (PC) is obtained by (melt) blending the first polypropylene (PP1) and the second polypropylene (PP2) and optional additives (AD).

Preferably, the first polypropylene (PP1) is a propylene polymer prepared in the presence of a Ziegler-Natta catalyst which is free of phthalic acid ester derivatives.

On the other hand, the second polypropylene (PP2) according to the first embodiment of the present invention is preferably a polymer known in the art. Preferably, the second polypropylene (PP2) according to the first embodiment of the present invention is the second polypropylene (PP2a) as described in detail below. In particular, the second polypropylene (PP2) is preferably a polypropylene produced in the presence of a Ziegler-Natta catalyst, like the commercial propylene homopolymer Bormed DM55pharm of Borealis AG.

According to a second embodiment of the present invention, it is especially preferred that the mixture (M), i.e. the mixture of the first polypropylene (PP1) and the second polypropylene (PP2), has a melt flow rate $MFR_2$ (230° C.) measured according to ISO 1133 in the range of 500 to 5000 g/10 min, more preferably in the range of 550 to 2000 g/10 min, more preferably in the range of 570 to 1700 g/10min, like in the range of 590 to 1500 g/10 min.

Additionally or alternatively to the previous paragraph it is preferred that the mixture (M), i.e. the mixture of the first polypropylene (PP1) and the second polypropylene (PP2), has a weight molecular weight Mw in the range of 65 to 100 kg/mol, more preferably in the range of 66 to 95 kg/mol, like in the range of 67 to 90 kg/mol.

Further it is preferred that the mixture (M), i.e. the mixture of the first polypropylene (PP1) and the second polypropylene (PP2), has a molecular weight distribution (Mw/Mn) in the range of 4.0 to 10.0, more preferably in the range of 4.5 to 9.0, like in the range of 5.0 to 8.0.

In a preferred embodiment the information provided for the mixture (M) with regard to the melt flow rate $MFR_2$, the weight molecular weight Mw as well as to the molecular weight distribution (Mw/Mn) is also applicable for the polypropylene composition (PC). This holds in particular true in case the polypropylene composition (PC) consists of the mixture (M) and optional additives (AD). Accordingly it is preferred that the polypropylene composition (PC) has a melt flow rate $MFR_2$ (230° C.) measured according to ISO in the range of 570 to 7500 g/10 min, more preferably in the range of 500 to 5000 g/10 min, more preferably in the range of 550 to 2000 g/10min, like in the range of 570 to 1700 g/10 min and/or a weight molecular in the range of 65 to 100 kg/mol, more preferably in the range of 65 to 95 kg/mol, like in the range of 67 to 90 kg/mol, and/or a molecular weight distribution (Mw/Mn) in the range of 4.0 to 10.0, more preferably in the range of 4.5 to 9.0, like in the range of 5.0 to 8.0.

It is especially preferred that the ratio of the weight molecular weight Mw of the mixture (M) to the weight molecular weight Mw of the first polypropylene (PP1) [Mw(M)/Mw(PP1)] is in the range of 1.4 to 20.0, more preferably in the range 1.5 to 17.0, yet more preferably in the range of 1.6 to 15.0.

Additionally or alternatively to the previous paragraph it is preferred that the weight molecular weight Mw of the polypropylene composition (PC) to the weight molecular weight Mw of the first polypropylene (PP1) [Mw(PC)/Mw(PP1)] is in the range of 1.4 to 20.0, more preferably in the range 1.5 to 17.0, yet more preferably in the range of 1.6 to 15.0.

Additionally it is preferred that the ratio of the weight molecular weight Mw of the second polypropylene (PP2) to the weight molecular weight Mw of the mixture (M) [Mw(PP2)/Mw(M)] is in the range of more than 1.0 to 2.5, more preferably in the range of more than 1.0 to 2.0, yet more preferably in the range of 1.1 to 1.8.

Additionally or alternatively to the previous paragraph it is preferred that the ratio of the weight molecular weight Mw of the second polypropylene (PP2) to the weight molecular weight Mw of the polypropylene composition (PC) [Mw(PP2)/Mw(PC)] is in the range of more than 1.0 to 2.5, more preferably in the range of more than 1.0 to 2.0, yet more preferably in the range of 1.1 to 1.8.

The polypropylene composition (PC) (and thus also the mixture (M)) can be produced in a sequential polymerization process wherein in a first step the first polypropylene (PP1) and in a second step the second polypropylene (PP2) is produced. Alternatively, in the first step the second polypropylene (PP2) may be produced and subsequently in a second step the first polypropylene (PP1). However, it is especially preferred that the polypropylene composition (PC) is obtained by (melt) blending the first polypropylene (PP1) and the second polypropylene (PP2) and optional additives (AD).

Preferably, the first polypropylene (PP1) is a propylene polymer prepared in the presence of a Ziegler-Natta catalyst which is free of phthalic acid ester derivatives.

On the other hand, the second polypropylene (PP2) according to the second embodiment of the present invention is preferably a polymer known in the art. Preferably, the second polypropylene (PP2) according to the second embodiment of the present invention is the second polypropylene (PP2b) as described in detail below. In particular, the second polypropylene (PP2) is preferably a polypropylene produced in the presence of a Ziegler-Natta catalyst, like the commercial propylene homopolymer HL504FB of Borealis AG.

The first polypropylene (PP1) and the second polypropylene (PP2) will be now defined in more detail.

The First Polypropylene (PP1)

As mentioned above the mixture (M) comprises, preferably consists of, the first polypropylene (PP1) and the second polypropylene (PP2). In the following both polymers are described in more detail.

The first polypropylene (PP1) preferably has a comonomer content, like ethylene content, of at most 5.0 wt.-%. Accordingly, the first polypropylene (PP1) can be a first random propylene copolymer (R-PP1) or a first propylene homopolymer (H-PP1), the latter being preferred.

The expression "propylene homopolymer" used in the instant invention relates to a polypropylene that consists substantially, i.e. of more than 99.70 wt.-%, still more preferably of at least 99.80 wt.-%, of propylene units. In a preferred embodiment only propylene units in the propylene homopolymer are detectable.

In case the first polypropylene (PP1) is a first random propylene copolymer (R-PP1) it is appreciated that the first random propylene copolymer (R-PP1) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the first random propylene copolymer (R-PP1) according to this invention comprises, especially consists of, monomers co-polymerizable with propylene from the group consisting of ethylene, 1-butene and 1-hexene. More specifically the first random propylene copolymer (R-PP1) of this invention comprises—apart from propylene—units derivable from ethylene and/or 1-butene. In a preferred embodiment the first random propylene copolymer (R-PP1) comprises units derivable from ethylene and propylene only, i.e. is a first propylene ethylene copolymer (PEC1). In this case the ethylene content is below 5.0 wt.-%, preferably in the range of 0.5 to 4.5 wt.-%, more preferably in the range of 0.8 to 2.5 wt.-%.

The term "random" indicates in the present invention that the co-monomers of the random propylene copolymers are randomly distributed within the propylene copolymer. The term random is understood according to IUPAC (Glossary of basic terms in polymer science; IUPAC recommendations 1996).

However, it is preferred that the first polypropylene (PP1) is a first propylene homopolymer (H-PP1).

The first polypropylene (PP1), more preferably the first propylene homopolymer (H-PP1), has a weight molecular weight Mw in the range of above 45 kg/mol to below 65 kg/mol, more preferably in the range of 48 to 62 kg/mol, yet more preferably in the range of 50 to 60 kg/mol.

Further it is preferred that the first polypropylene (PP1), more preferably the first propylene homopolymer (H-PP1), has a molecular weight distribution (Mw/Mn) in the range of 4.0 to 10.0, more preferably in the range of 4.5 to 9.0, like in the range of 5.0 to 8.0.

The first polypropylene (PP1), more preferably the first propylene homopolymer (H-PP1), has a melting temperature Tm of at least 140° C., preferably in the range of 145 to 165° C., more preferably in the range of 148 to 162° C.

Further, it is preferred that the melt enthalpy (Hm) determined according to ISO 11357-3 of the first polypropylene (PP1), more preferably the first propylene homopolymer (H-PP1), is in the range of 85 to 125 J/g, more preferably in the range of 90 to 120 J/g, still more preferably in the range of 95 to 118 J/g.

In addition, it is preferred that the first polypropylene (PP1), more preferably the first propylene homopolymer (H-PP1), has a crystallinity in the range of 40 to 65%, more preferably in the range of 42 to 62%, still more preferably in the range of 45 to 60%.

Further it is preferred that the first polypropylene (PP1), more preferably the first propylene homopolymer (H-PP1), has a xylene cold soluble (XCS) fraction in the range of 1.0 to 20.0 wt.-%, more preferably in the range of 1.5 to 15.0 wt.-%, like in the range of 2.0 to 10.0 wt.-%.

The first polypropylene (PP1) may be produced in a sequential polymerization process comprising one reactor or at least two reactors connected in series.

The term "sequential polymerization process" indicates that the first polypropylene (PP1) is produced in at least two, like three, reactors connected in series. Accordingly, the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor are gas phase reactors (GPR). Accordingly, for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the first polypropylene (PP1) as defined above the conditions for the first reactor, i.e. the slurry reactor, like a loop reactor, may be as follows:

the temperature is within the range of 62° C. to 85° C., preferably between 65° C. and 82° C., more preferably between 67 and 80° C., the pressure is within the range of 20 bar to 80 bar, preferably between 35 bar to 70 bar, hydrogen can be added for controlling the molar mass in a manner known per se.

Subsequently, the reaction mixture of the first reactor is transferred to the second reactor, i.e. gas phase reactor, where the conditions are preferably as follows:

the temperature is within the range of 75° C. to 95° C., preferably between 78° C. and 92° C., the pressure is within the range of 5 bar to 50 bar, preferably between 15 bar to 35 bar, hydrogen can be added for controlling the molar mass in a manner known per se.

The condition in the third reactor is similar to the second reactor.

The residence time can vary in the three reactor zones.

In one embodiment of the process for producing the first polypropylene (PP1) the residence time in bulk reactor, e.g. loop is in the range 0.20 to 1.50 hours, e.g. 0.25 to 1.00 hours and the residence time in gas phase reactor will generally be 0.20 to 2.00 hours, like 0.30 to 1.50 hours.

If desired, the polymerization may be effected in a known manner under supercritical conditions in the first reactor, i.e. in the slurry reactor, like in the loop reactor, and/or as a condensed mode in the gas phase reactors.

Preferably, the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step.

However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

As pointed out above in the specific process for the preparation of the first polypropylene (PP1), as defined above, a specific Ziegler-Natta catalyst (ZN-C) must be used. Accordingly, the Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is self-supported.

The Ziegler-Natta catalyst (ZN-C) can be further defined by the way as obtained. Accordingly, the Ziegler-Natta catalyst (ZN-C) is preferably obtained by a process comprising the steps of a)
$a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;

or $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;

or $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"$(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt.-% solution in a solvent as indicated above. Typical commercially available Mg compound, especially dialkyl magnesium solutions are 20-40 wt.-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100 μm. Particles are compact with low porosity and have surface area below 20 g/m$^2$, more preferably below 10 g/m$^2$. Typically, the amount of Ti is 1 to 6 wt.-%, Mg 10 to 20 wt.-% and donor 10 to 40 wt.-% of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula $$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula $$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor), the cyclohexylmethyl dimethoxy silane donor (C-Donor) or the diethylaminomethyl triethoxysilane donor (U-Donor), the latter especially preferred.

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH$_3$, of less than 1.0 wt.-% with respect to the triethyl aluminium (TEAL). More preferably, the hydride content is less than 0.5 wt.-%, and most preferably the hydride content is less than 0.1 wt.-%.

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 450, still more preferably is in the range of 120 to 350.

The Second Polypropylene (PP2)

The second polypropylene (PP2) preferably has a comonomer content, like ethylene content, of at most 1.0 wt.-%, more preferably of at most 0.7 wt.-%, yet more preferably of at most 0.5 wt.-%. Accordingly, the second polypropylene (PP2) can be a second random propylene copolymer (R-PP2) or a second propylene homopolymer (H-PP2), the latter being preferred.

In case the second polypropylene (PP2) is a second random propylene copolymer (R-PP2) it is appreciated that the second random propylene copolymer (R-PP2) comprises monomers co-polymerizable with propylene, for example co-monomers such as ethylene and/or C$_4$ to C$_{12}$ α-olefins, in particular ethylene and/or C$_4$ to C$_8$ α-olefins, e.g. 1-butene and/or 1-hexene. Preferably the second random propylene copolymer (R-PP2) according to this invention comprises, especially consists of, monomers co-polymerizable with propylene from the group consisting of ethylene, 1-butene and 1-hexene. More specifically the second random propylene copolymer (R-PP2) of this invention comprises—apart from propylene—units derivable from ethylene and/or 1-butene. In a preferred embodiment the second random propylene copolymer (R-PP2) comprises units derivable from ethylene and propylene only, i.e. is a second propylene ethylene copolymer (PEC2).

Additionally, it is appreciated that the second random propylene copolymer (R-PP2), preferably the second propylene ethylene copolymer (PEC2), has preferably a comonomer content, like an ethylene content, in the range of 0.1 to 1.0 wt.-%, more preferably in the range of more than 0.2 to 0.7 wt.-%, yet more preferably in the range of 0.25 to 0.5 wt.-%.

It is especially preferred that the weight molecular weight Mw of second polypropylene (PP2), like the second propylene homopolymer (H-PP2), is higher than the weight molecular weight Mw of the first polypropylene (PP1), like the first random propylene copolymer (R-PP1), e.g. the first propylene ethylene copolymer (PEC1).

In a specific embodiment, the second polypropylene (PP2), like the second propylene homopolymer (H-PP2), has preferably a melting temperature Tm in the range of 150 to 170° C., yet more in the range of 155 to 167° C., still yet more preferably in the range of 157 to 165° C.

In addition, it is preferred that the second polypropylene (PP2), like the second propylene homopolymer (H-PP2), has crystallinity in the range of 43 to 68%, more preferably in the range of 46 to 63%, still more preferably in the range of 49 to 58%.

Further it is preferred that the second polypropylene (PP2), like the second propylene homopolymer (H-PP2), has a xylene cold soluble (XCS) fraction in the range of 1.0 to 15.0 wt.-%, more preferably in the range of 1.5 to 10.0 wt.-%, like in the range of 2.0 to 6.0 wt.-%.

According to a first embodiment of the present invention, the second polypropylene (PP2) is preferably a second polypropylene (PP2a). Preferably, the second polypropylene (PP2a) is a second propylene homopolymer (H-PP2a).

It is preferred that the weight molecular weight Mw of the second polypropylene (PP2a), like the second propylene homopolymer (H-PP2a), is in the range of 210 to 950 kg/mol, more preferably in the range of 250 to 750 kg/mol, like in the range of 290 to 670 kg/mol.

Additionally or alternatively to the previous paragraph it is preferred that the second polypropylene (PP2a), like the second propylene homopolymer (H-PP2a), has a melt flow rate $MFR_2$ (230° C.) measured according to ISO 1133 in the range of 0.5 to 30.0 g/10 min, more preferably in the range of 1.0 to 25.0 g/10 min, more preferably in the range of 1.5 to 20.0 g/10min, like in the range of 2.0 to 15.0 g/10 min.

Further it is preferred that the second polypropylene (PP2a), like the second propylene homopolymer (H-PP2a), has a molecular weight distribution (Mw/Mn) in the range of 2.5 to 8.0, more preferably in the range of 3.0 to 7.0, like in the range of 3.5 to 6.5.

According to a second embodiment of the present invention, the second polypropylene (PP2) is preferably a second polypropylene (PP2b). Preferably, the second polypropylene (PP2b) is a second propylene homopolymer (H-PP2b).

It is preferred that the weight molecular weight Mw of the second polypropylene (PP2b), like the second propylene homopolymer (H-PP2b), is in the range of 70 to 125 kg/mol, more preferably in the range of 75 to 115 kg/mol, like in the range of 80 to 110 kg/mol.

Additionally or alternatively to the previous paragraph it is preferred that the second polypropylene (PP2b), like the second propylene homopolymer (H-PP2b), has a melt flow rate $MFR_2$ (230° C.) measured according to ISO 1133 in the range of 300 to 2000 g/10 min, more preferably in the range of 350 to 1500 g/10 min, more preferably in the range of 400 to 1200 g/10min.

Further it is preferred that the second polypropylene (PP2b), like the second propylene homopolymer (H-PP2b), has a molecular weight distribution (Mw/Mn) in the range of 1.5 to 7.5, more preferably in the range of 2.0 to 6.5, like in the range of 2.5 to 6.0.

Additives (AD)

In addition to the mixture (M) the polypropylene composition (PC) may include additives (AD). Typical additives are nucleating agents acid scavengers, antioxidants, colorants, light stabilisers, plasticizers, slip agents, anti-scratch agents, dispersing agents, processing aids, lubricants, pigments, and the like.

Such additives are commercially available and for example described in "Plastic Additives Handbook", $6^{th}$ edition 2009 of Hans Zweifel (pages 1141 to 1190).

Furthermore, the term "additives (AD)" according to the present invention also includes carrier materials, in particular polymeric carrier materials (PCM).

The Polymeric Carrier Material (PCM)

Preferably the polypropylene composition (PC) of the invention does not comprise (a) further polymer (s) different to the mixture (M), i.e. different to the first polypropylene (PP1) and the second polypropylene (PP2), in an amount exceeding 10 wt.-%, preferably in an amount exceeding 5 wt.-%, more preferably in an amount exceeding 3 wt.-%, based on the weight of the polypropylene composition (PC). If an additional polymer is present, such a polymer is typically a polymeric carrier material (PCM) for additives (AD). Any carrier material for additives (AD) is not calculated to the amount of polymeric compounds as indicated in the present invention, but to the amount of the respective additive.

The polymeric carrier material (PCM) is a carrier polymer for the other additives (AD) to ensure a uniform distribution in the composition of the invention. The polymeric carrier material (PCM) is not limited to a particular polymer. The polymeric carrier material (PCM) may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Molded Article and the Film

The molded article and/or the film according to this invention must comprise the polypropylene composition (PC) as defined above, especially under the headings "The polypropylene composition (PC) and the mixture (M), "The first polypropylene (PP1)", "The second polypropylene (PP2) and "Additives".

Preferably, the molded article and/or the film according to this invention comprises the polypropylene composition (PC) and the mixture (M) according to the first embodiment of the present invention wherein the polypropylene composition (PC) and/or the mixture (M) has/have a melt flow rate $MFR_2$ (230° C.) measured according to ISO 1133 in the range of 2.0 to 50.0 g/10 min, more preferably in the range of 3.0 to 30.0 g/10 min, more preferably in the range of 3.5 to 15.0 g/10min, like in the range of 4.2 to 12.0 g/10 min and/or a weight molecular weight in the range of 200 to 560 kg/mol, more preferably in the range of 300 to 520 kg/mol, like in the range of 390 to 490 kg/mol, and/or a molecular weight distribution (Mw/Mn) in the range of 5.0 to 8.0, more preferably in the range of 5.1 to 7.2, like in the range of 5.1 to 6.5.

It is especially preferred that the molded article and/or the film according to this invention comprises the polypropylene composition (PC) and the mixture (M) according to the first embodiment of the present invention wherein the second polypropylene (PP2) is the second polypropylene (PP2a) as defined above.

It is preferred that the main component of the molded article and/or the film is the polypropylene composition (PC). Accordingly, it is preferred that the molded article and/or the film contains at least 80 wt.-%, more preferably at least 90 wt.-%, still more preferably 95 wt.-% of the polypropylene composition (PC). Thus in one preferred embodiment the molded article and/or the film consists of the polypropylene composition (PC).

Additionally, it is preferred that the molded article and/or the film comprises at least 80 wt.-%, more preferably at least 85 wt.-%, yet more preferably at least 90 wt.-%, like at least 95 wt.-%, of the mixture (M), i.e. of the first polypropylene (PP1) and the second polypropylene (PP2) together, based on the total weight of the molded article and/or the film.

All preferred embodiments for the polypropylene composition (PC) are also preferred embodiments for the polypropylene composition (PC) of the molded article and/or the film.

It is especially preferred that the polypropylene composition (PC) of the molded article and/or the film is based on the polypropylene composition (PC) as defined above in which the second polypropylene (PP2) is the second polypropylene (PP2a).

It is preferred that the molded article and/or the film has/have a tensile modulus determined according to ISO 527-2 in the range of 1400 to 3000 MPa, more preferably in the range of 1470 to 2500 MPa, still more preferably in the range of 1500 to 2200 MPa.

Further, the molded article and/or the film preferably has/have heat deflection temperature determined according to ISO 75 A (1.80 MPa load) in the range of 60 to 100° C., more preferably in the range of 63 to 95° C., like in the range of 65 to 90° C.

The Melt Blown Fiber (MBF)

The melt blown fiber (MBF) according to this invention must comprise a polypropylene composition (PC) as defined above, especially under the headings "The polypropylene composition (PC) and the mixture (M), "The first polypropylene (PP1)", "The second polypropylene (PP2) and "Additives".

Preferably, the melt blown fiber (MBF) according to this invention comprises the polypropylene composition (PC) and the mixture (M) according to the second embodiment of the present invention wherein the polypropylene composition (PC) and/or the mixture (M) has/have a melt flow rate $MFR_2$ (230° C.) measured according to ISO in the range of 570 to 7500 g/10 min, more preferably in the range of 600 to 4000 g/10 min, more preferably in the range of 690 to 2000 g/10min, like in the range of 720 to 1000 g/10 min and/or a weight molecular in the range of 67 to 90 kg/mol, more preferably in the range of 67 to 80 kg/mol, like in the range of 67 to 70 kg/mol, and/or a molecular weight distribution (Mw/Mn) in the range of 5.0 to 8.0, more preferably in the range of 5.1 to 7.2, like in the range of 5.1 to 6.5.

It is especially preferred that the melt blown fiber (MBF) according to this invention comprises the polypropylene composition (PC) and the mixture (M) according to the second embodiment of the present invention wherein the second polypropylene (PP2) is the second polypropylene (PP2b) as defined above.

The definition of the melt blown fiber (MBF) is also applicable to the sum of melt blown fibers (MBFs) which are produced with the same material comprising the polypropylene composition (PC), preferably which are produced with the same polypropylene composition (PC).

It is preferred that the main component of the melt blown fiber (MBF) is the polypropylene composition (PC). Accordingly, it is preferred that the melt blown fiber (MBF) contains at least 80 wt.-%, more preferably at least 90 wt.-%, still more preferably 95 wt.-% of the polypropylene composition (PC). Thus in one preferred embodiment the melt blown fiber (MBF) consists of the polypropylene composition (PC).

Additionally, it is preferred that the melt blown fiber (MBF) comprises at least 80 wt.-%, more preferably at least 85 wt.-%, yet more preferably at least 90 wt.-%, like at least 95 wt.-%, of the mixture (M), i.e. of the first polypropylene (PP1) and the second polypropylene (PP2) together, based on the total weight of the melt blown fiber (MBF).

All preferred embodiments for the polypropylene composition (PC) are also preferred embodiments for the polypropylene composition (PC) of the melt blown fiber (MBF). It is especially preferred that the polypropylene composition (PC) of the melt blown fiber (MBF) is based on the polypropylene composition (PC) as defined above in which the second polypropylene (PP2) is the second polypropylene (PP2b).

Preferably the melt blown fibers (MBFs) according to the present invention preferably have an average diameter measured of not more than 5.0 μm, more preferably of not more than 4.5 μm. It is in particular appreciated that the average diameter of the melt blown fibers (MBFs) is in the range of 0.3 to 5.0 μm, more preferably in the range of 0.5 to 4.5 μm, yet more preferably in the range of 0.7 to 4.0 μm.

The Melt Blown Web (MBW)

The present invention is not only directed to the melt blown fibers (MBFs) as such but also to articles, like webs, made thereof.

In particular the present invention is directed to a melt blown web (MBW) comprising melt blown fibers (MBFs) of the instant invention. More preferably the melt blown web (MBW) comprises, based on the total weight of the melt blown web (MBW), at least 80 wt.-%, more preferably at least 90 wt.-%, yet more preferably at least 95 wt.-%, like at least 99 wt.-%, of melt blown fibers (MBFs) as defined herein. In one specific embodiment the melt blown web (MBW) consists of the melt blown fibers (MBFs) as defined herein.

Further the present invention is directed to articles comprising the melt blown fibers (MBFs) and/or the melt-blown web (MBW) of the present invention, like filtration medium (filter), diaper, sanitary napkin, panty liner, incontinence product for adults, protective clothing, surgical drape, surgical gown, and surgical wear, comprising the melt-blown fibers (MBFs) and/or the melt-blown web (MBW), preferably in an amount of at least 80.0 wt.-% of , more preferably in an amount of at least 95.0 wt.-%, based on the total weight of the article. In one embodiment of the present invention, the article consists of the melt-blown fibers (MBFs) and/or the melt-blown web (MBW).

In one embodiment the invention is directed to articles selected from the group consisting of filtration medium (filter), diaper, sanitary napkin, panty liner, incontinence product for adults, protective clothing, surgical drape, surgical gown, and surgical wear, comprising a melt blown web (MBW) comprising, e.g. consisting of, the melt blown fibers (MBFs) of the present invention and a spunbonded fabric known in the art.

The weight per unit area of the melt-blown web (MBW) depends very much on the end use, however it is preferred that the melt-blown web has a weight per unit area of at least 1 g/m², more preferably in the range from 1 to 250 g/m², still more preferably in the range from 3 to 220 g/m², yet more preferably in the range from 6 to 200 g/m², like in the range from 6 to 100 g/m². These values are especially applicable in case the melt-blown web (MBW) according to the instant invention is produced as a single layer web (e.g. for air filtration purposes).

In case the melt-blown web (MBW) according to the instant invention is produced as one part of a multi-layer construction like an SMS-web comprising, preferably consisting of, a spunbonded web layer, a melt-blown web (MBW) layer and another spunbonded web layer (e.g. for hygienic application), the melt-blown web (MBW) has a weight per unit area of at least 1 g/m², more preferably in the range of 1 to 30 g/m², still more preferably in the range of 1.3 to 20 g/m².

Additionally or alternatively to the previous paragraph, the melt blown web (MBW) preferably has an air permeability measured at a melt temperature of 270° C. below 1300 m³/h, more preferably below 1250 m³/h, like in the range of 1100 to 1230 m³/h.

Further, the melt blown web (MBW) preferably has a hydrohead (3rd drop) measured at a melt temperature of 270° C. above 52 cm $H_2O$, more preferably above 55 cm $H_2O$, still more preferably above 58 cm $H_2O$.

Alternatively, the multi-layer construction can also include a multiplicity of melt-blown web layers and spunbonded web layers, such as a SSMMS construction.

The instant polypropylene composition (PC) is preferably used in pellet or granule form for the preparation of the melt-blown fibers (MBFs) (and thus of the melt-blown web (MBW)).

In the process metering pumps are used to pump the molten t polypropylene composition (PC) to a distribution system having a series of die tips, the polypropylene composition (PC) being in the molten state at some processing temperature. The die tip is designed in such a way that the holes are in a straight line with high-velocity air impinging from each side. A typical die will have 0.3 to 0.5 mm diameter, preferably 0.4 mm diameter, holes spaced at 10 to 16 per cm (25 to 40 per inch). The impinging high-velocity hot air attenuates the filaments and forms the desired fibers Immediately below or adjacent to the die, a large amount of ambient air is drawn into the hot air stream containing the fibers which cools the hot gas and solidifies the fibers onto a forming belt or other solid surface that is typically moving in such a manner as to create a continually renewed surface for the fibers to contact and form a web. The processing temperature is one factor in the final web properties. The "optimal" processing temperature is one at which ideal properties of the web are achieved such as low shot with good hand and high barrier properties, or good filtration properties. The properties of the melt-blown fibers (MBFs) and/or the melt blown web (MBW) can be further improved in case the cooling of the fibers is not accomplished with ambient air but by water cooling.

In the following the present invention is further illustrated by means of examples.

EXAMPLES

1. Definitions/Measuring Methods

The following definitions of terms and determination methods apply for the above general description of the invention as well as to the below examples unless otherwise defined.

Quantification of microstructure by NMR spectroscopy

Quantitative nuclear-magnetic resonance (NMR) spectroscopy was used to quantify the comonomer content of the polymers. Quantitative $^{13}C$ $\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun 2007, 28, 1128). A total of 6144 (6k) transients were acquired per spectra.

Quantitative $^{13}C$ $\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ $\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$E=0.5(S\beta\beta+S\beta\gamma+S\beta\delta+0.5(S\alpha\beta+S\alpha\gamma))$

Through the use of this set of sites the corresponding integral equation becomes:

$E=0.5(I_H+I_G+0.5(I_C+I_D))$ using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

E [mol %]=100*fE

The weight percent comonomer incorporation was calculated from the mole fraction:

E [wt %]=100*(fE *28.06)/((fE*28.06)+((1-fE)*42.08))

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

$MFR_2$ (230° C./2.16 kg) is measured according to ISO 1133 at 230° C. and 2.16 kg load.

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4: 2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min 200 µï of sample solution were injected per analysis. The column set was calibrated using universal calibration (according to ISO 16014-2:2003) with at least 15 narrow MWD polystyrene (PS) standards in the range of 0,5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Xylene cold soluble fraction (XCS wt.-%): Content of xylene cold solubles (XCS) is determined at 25° C. according ISO 16152; first edition; 2005-07-01.

DSC analysis, melting temperature ($T_m$) and heat of fusion ($H_f$), crystallization temperature ($T_c$) and melt enthalpy (Hm): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. The crystallization temperature ($T_c$) is determined from the cooling step, while melting temperature ($T_m$) and melting enthalpy ($H_m$) are determined from the second heating step. The crystallinity is calculated from the melting enthalpy by assuming an Hm-value of 209 J/g for a fully crystalline polypropylene (see Brandrup, J., Immergut, E. H., Eds. Polymer Handbook, 3rd ed. Wiley, New York, 1989; Chapter 3).

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

The Tensile Modulus is measured according to ISO 527-2 (cross head speed=50 mm/min; 23° C.) using injection molded specimens as described in EN ISO 1873-2 (dog bone shape, 4 mm thickness).

Elongation at break is determined according to ISO 527/2/5A at 50 mm/min and 23° C. on 4 mm thick compression moulded samples prepared according to EN ISO 1873-2 as described above.

The Tensile Strength was determined according to ISO 527 using injection molded test specimens as described in EN ISO 1873-2 (170×10×4 mm).

Grammage of the Web

The unit weight (grammage) of the webs in g/m$^2$ was determined in accordance with EN 29073-1 (1992) "Test methods for nonwovens—Determination of mass per unit area"

Average Fibre Diameter in the Web

The number average fibre diameter was determined using scanning electron microscopy (SEM). A representative part of the web was selected and an SEM micrograph of suitable magnification was recorded, then the diameter of 20 fibres was measured and the number average calculated.

Heat DeflectionTemperature (HDT):

The HDT was determined on injection molded test specimens of 80×10×4 mm$^3$ prepared according to ISO 1873-2 and stored at +23° C. for at least 96 hours prior to measurement. The test was performed on flatwise supported specimens according to ISO 75, condition A, with a nominal surface stress of 1.80 MPa.

Hydrohead

The hydrohead or water resistance as determined by a hydrostatic pressure test is determined according to the WSP (wordwide strategic partners) standard test WSP 80.6 (09) as published in December 2009. This industry standard is in turn based on ISO 811:1981 and uses specimens of 100 cm$^2$ at 23° C. with purified water as test liquid and a rate of increase of the water pressure of 10 cm/min.

Air Permeability

The air permeability was determined in accordance with DIN ISO 9237.

EXAMPLES

1. Preparation of the First Polypropylene (PP1)

Preparation of the Catalyst

The catalyst used in the polymerization processes for the first polypropylene (PP1) of the inventive examples (IE) was prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol-(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of a Mg Alkoxy Compound Mg alkoxide solution was prepared by adding, with stirring (70 rpm), into 11 kg of a 20 wt.-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stilling (70 rpm).

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and diethylaminomethyl triethoxysilane (U-Donor) as donor.

The aluminium to donor ratio, the aluminium to titanium ratio and the polymerization conditions are indicated in table 1.

TABLE 1

Preparation of (PP1) (inventive)

| | | PP1 |
|---|---|---|
| Prepolymerization | | |
| TEAL/Ti | [mol/mol] | 257 |
| TEAL/donor | [mol/mol] | 12.9 |
| Temperature | [° C.] | 25 |
| res. time | [h] | 0.30 |
| Loop | | |
| Temperature | [° C.] | 70 |
| H2/C3 ratio | [mol/kmol] | 24.1 |
| C2/C3 ratio | [mol/kmol] | 0 |
| $MFR_2$ | [g/10 min] | 4400 |
| XCS | [wt.-%] | 7.1 |
| C2 content | [wt.-%] | 0 |

TABLE 2

Properties of the first polypropylenes (PP1) (inventive) and (PP1') (comparative) and the second polypropylenes (PP2a) and (PP2b)

| | | PP1 | PP1' | PP2a | PP2b |
|---|---|---|---|---|---|
| $MFR_2$ | [g/10 min] | 4400 | 6050 | 3.6 | 450 |
| Mw | [kg/mol] | 54.6 | 46.5 | 540 | 102 |
| MWD | — | 5.8 | 2.8 | 4.9 | 4.0 |
| C2 (total) | [wt.-%] | 0 | 13 | 0 | 0 |
| XCS | [wt.-%] | 6.3 | 99.1 | 2.3 | 2.7 |
| Tc | [° C.] | 122 | 28 | 114 | 112 |
| Tm | [° C.] | 165 | 71 | 162 | 161 |
| Hm | [J/g] | 106 | 31 | 104 | 105 |
| Crystallinity | [%] | 51 | 14 | 49 | 50 |

PP1' is the commercial wax "Licocene 1602" by Clariant
PP2a is the commercial propylene homopolymer "DM55pharm" of Borealis AG
PP2b is the commercial propylene homopolymer "HL504FB" of Borealis AG 2. Preparation of the Polypropylene Composition (PC)

The two components PP1 and PP2a or PP2b were melt-mixed in weight ratios as indicated in table 3 below in a Thermo PRISM TSE 24 twin-screw extruder at 200-240° C., followed by solidification of the resulting melt strands in a water bath and pelletization.

TABLE 3

Properties of the polypropylene composition (PC) for application in a molded article/film

| | | IE1 | IE2 | IE3 | CE1 | CE2 | CE3 |
|---|---|---|---|---|---|---|---|
| PP1 (inventive) | [wt.-%] | 10 | 20 | 30 | 0 | 0 | 0 |
| PP1' (comparative) | [wt.-%] | 0 | 0 | 0 | 0 | 10 | 20 |
| PP2a | [wt.-%] | 90 | 80 | 70 | 100 | 90 | 80 |
| MFR | [g/10 min] | 4.5 | 7.4 | 11.9 | 3.6 | 4.7 | 6.0 |
| Mw | [kg/mol] | 490 | 437 | 395 | 540 | 485 | 425 |
| Mw/Mn | [—] | 5.1 | 5.8 | 6.4 | 4.9 | 4.9 | 5.3 |
| Mw(M)/Mw(PP1) | [—] | 12.1 | 10.8 | 9.8 | — | 8.9 | 7.8 |
| Tc | [° C.] | 118 | 119 | 121 | 114 | 113 | 112 |
| Tm | [° C.] | 163 | 162 | 163 | 162 | 164 | 165 |
| Hm | [J/g] | 106 | 110 | 111 | 104 | 95 | 90 |
| Crystallinity | [%] | 51 | 53 | 54 | 49 | 45 | 43 |
| XCS | [wt.-%] | 2.7 | 3.4 | 3.8 | 2.3 | 12.0 | 21.5 |
| HDT ISO 75 A | [° C.] | 66.0 | 68.0 | 68.0 | 63.3 | 56.3 | 53.8 |
| Tensile modulus | [MPa] | 1525 | 1681 | 1691 | 1457 | 1111 | 933 |
| Elongation at break | [%] | 339 | 114 | 130 | 228 | 520 | 602 |
| Tensile strength | [MPa] | 35 | 36 | 36 | 34 | 29 | 27 |

TABLE 4

Properties of the polypropylene composition (PC) for application in a melt blown web

|  |  | IE4 | CE4 |
|---|---|---|---|
| PP1 (inventive) | [wt.-%] | 22 | 0 |
| PP1' (comparative) | [wt.-%] | 0 | 0 |
| PP2b | [wt.-%] | 78 | 100 |
| MFR | [g/10 min] | 740 | 450 |
| Mw | [kg/mol] | 67 | 102 |
| Mw/Mn | [—] | 5.2 | 4.0 |
| Mw(M)/Mw(PP1) | [—] | 1.7 | — |
| Tc | [° C.] | 115 | 112 |
| Tm | [° C.] | 162 | 161 |
| Hm | [J/g] | 104 | 105 |
| Crystallinity | [%] | 49 | 50 |
| XCS | [wt.-%] | 3.5 | 2.7 |

TABLE 5

MBW properties (DCD 200 mm, throughput 10 kg/h · m)

| Example | Measured at melt temperature [° C.] | Air volume [m³/h] | Web weight [g/m²] | Air permeability [mm/s] | Hydrohead (in. 1st) [cm H₂O] | Hydrohead (in. 3rd) [cm H₂O] |
|---|---|---|---|---|---|---|
| IE4 | 270 | 380 | 9.5 | 1190 | 55 | 59 |
|  | 290 | 250 | 9.5 | 814 | 84 | 89 |
|  | 310 | 200 | 8.5 | 400 | 92 | 128 |
|  | 300 | 230 | 9.2 | 587 | 87 | 105 |
| CE4 | 250 | 520 | 9.4 | 1727 | 35 | 41 |
|  | 270 | 430 | 9.4 | 1364 | 45 | 52 |
|  | 290 | 310 | 9.5 | 1065 | 77 | 81 |
|  | 300 | 250 | 9.5 | 638 | 13 | 24 |

The invention claimed is:

1. A polypropylene composition comprising:
 a) a first polypropylene having a weight average molecular weight Mw in the range of above 45 kg/mol to below 65 kg/mol, a molecular weight distribution (Mw/Mn) in the range of 4.0 to 10.0, and a melting temperature of at least 140 ° C., and
 b) a second polypropylene having a higher weight average molecular weight Mw than the first polypropylene.

2. The polypropylene composition according to claim 1, wherein the first polypropylene has a xylene cold soluble (XCS) fraction in the range of 1.0 to 20.0 wt.-%.

3. The polypropylene composition according to claim 1, wherein the mixture consisting of the first polypropylene and the second polypropylene has a melting temperature of at least 150 ° C.

4. The polypropylene composition according to claim 1, wherein the second polypropylene is a propylene homopolymer.

5. The polypropylene composition according to claim 1, wherein the amount of the first polypropylene and the second polypropylene together makes up at least 80 wt.-% of the polypropylene composition (PC).

6. The polypropylene composition according to claim 1, wherein the polypropylene composition comprises at least 66 wt.-% of the second polypropylene and at least 5 wt.-% of the first polypropylene.

7. The polypropylene composition according to claim 1, wherein the weight ratio between the first polypropylene and the second polypropylene is in the range of 0.02 to 0.60.

8. The polypropylene composition according to claim 1, wherein the first polypropylene has been polymerized in the presence of:
 a) a Ziegler-Natta catalyst comprising compounds of a transition metal of Group 4 to 6 of IUPAC, a Group 2 metal compound and an internal donor, wherein said internal donor is a non-phthalic compound, preferably is a non-phthalic acid ester;
 b) optionally a co-catalyst, and
 c) optionally an external donor.

9. The polypropylene composition according to claim 1, wherein the mixture (M) consisting of the first polypropylene and the second polypropylene has:
 a) a melt flow rate $MFR_2$ (230 ° C.) measured according to ISO 1133 in the range of 2.0 to 50 g/10 min and/or
 b) a weight average molecular weight Mw in the range of 200 to 560 kg/mol, and wherein the weight average molecular weight Mw of the second polypropylene is in the range of 210 to 950 kg/mol.

10. The polypropylene composition according to claim 1, wherein the mixture consisting of the first polypropylene and the second polypropylene has:
 a) a melt flow rate $MFR_2$ (230 ° C.) measured according to ISO 1133 in the range of 500 to 5000 g/10 min and/or
 b) a weight average molecular weight Mw in the range of 65 to 100 kg/mol, and wherein the weight average molecular weight Mw of the second polypropylene is in the range of 70 to 125 kg/mol.

11. A molded article, comprising a polypropylene composition comprising:
 a) a first polypropylene having a weight average molecular weight in the range of above 45 kg/mol to below 65 kg/mol, a molecular weight distribution (Mw/Mn) in the range of 4.0 to 10.0, and a melting temperature of at least 140 ° C., and
 b) a second polypropylene having a higher weight average molecular weight Mw than the first polypropylene.

12. A film or melt blown fiber, comprising a polypropylene composition comprising:
 a) a first polypropylene having a weight average molecular weight Mw in the range of above 45 kg/mol to below 65 kg/mol, a molecular weight distribution (Mw/Mn) in the range of 4.0 to 10.0, and a melting temperature of at least 140 ° C., and b) a second polypropylene having a higher weight average molecular weight Mw than the first polypropylene.

13. The melt blown fiber according to claim 12, wherein the amount of the polypropylene composition makes up at least 80 wt.-% of the melt blown fiber.

14. The melt blown fiber according to claim 12, wherein the melt blown fiber is incorporated into a melt-blown web.

15. The melt blown fiber according to claim 14, wherein the melt-blown web has a weight per unit area of at most 120 g/m².

16. The melt blown fiber according to claim 14, wherein the melt-blown web is incorporated into an article that is selected from the group consisting of filtration medium, diaper, sanitary napkin, panty liner, incontinence product for adults, protective clothing, surgical drape, surgical gown, and surgical wear.

* * * * *